(12) United States Patent
Moore et al.

(10) Patent No.: US 11,486,710 B2
(45) Date of Patent: Nov. 1, 2022

(54) SYSTEM AND METHOD FOR DETERMINING A THREE-DIMENSIONAL TRAVEL PATH FOR A VEHICLE

(71) Applicant: The Boeing Company, Chicago, IL (US)

(72) Inventors: Michael E. Moore, O'Fallon, MO (US); Tyler J. DeJean, Saint Charles, MO (US)

(73) Assignee: THE BOEING COMPANY, Chicago, IL (US)

( * ) Notice: Subject to any disclaimer, the term of this patent is extended or adjusted under 35 U.S.C. 154(b) by 261 days.

(21) Appl. No.: 16/840,809

(22) Filed: Apr. 6, 2020

(65) Prior Publication Data

US 2021/0310810 A1 Oct. 7, 2021

(51) Int. Cl.
*G01C 21/20* (2006.01)

(52) U.S. Cl.
CPC .................... *G01C 21/20* (2013.01)

(58) Field of Classification Search
CPC .. G08G 5/0013; G08G 5/0026; G08G 5/0034; G08G 1/20; G08G 5/0008; G08G 5/0021; G08G 5/0039; G08G 5/0091; G01C 21/20; G01C 21/3469; G01C 21/3484; G01C 21/3617; G01C 23/00; G06Q 10/047; G05D 1/0005
USPC ...... 244/1 R; 340/441; 701/13–14, 300, 400, 701/411, 514, 532; 702/3, 142–143, 150, 702/152–153, 158, 181
See application file for complete search history.

(56) References Cited

U.S. PATENT DOCUMENTS

| 9,476,719 | B2 * | 10/2016 | Meyer ................. G01C 21/26 |
| 9,940,840 | B1 * | 4/2018 | Schubert ........... G01C 21/3407 |
| 2009/0299558 | A1 | 12/2009 | Hidaka |
| 2010/0094496 | A1 | 4/2010 | Hershkovitz et al. |
| 2011/0060517 | A1 | 3/2011 | Kono et al. |
| 2011/0288765 | A1 * | 11/2011 | Conway ........... G08G 1/096816 701/533 |
| 2012/0109515 | A1 | 5/2012 | Uyeki et al. |
| 2013/0030605 | A1 | 1/2013 | Basir et al. |
| 2013/0151046 | A1 | 6/2013 | Choi et al. |
| 2013/0179057 | A1 * | 7/2013 | Fisher ................ G01C 21/3469 701/1 |
| 2013/0261966 | A1 | 10/2013 | Wang et al. |
| 2014/0172285 | A1 | 6/2014 | Kuhn et al. |
| 2015/0345966 | A1 | 12/2015 | Meuleau |
| 2015/0345967 | A1 | 12/2015 | Meuleau |
| 2015/0345971 | A1 | 12/2015 | Meuleau et al. |
| 2016/0245662 | A1 | 8/2016 | Rajagopalan et al. |
| 2017/0075360 | A1 | 3/2017 | Von Novak |

(Continued)

FOREIGN PATENT DOCUMENTS

| CA | 3013604 A1 * | 2/2019 | ............... G08G 5/00 |
| CN | 105004462 B * | 7/2017 | |

(Continued)

*Primary Examiner* — Jeffrey P Aiello
(74) *Attorney, Agent, or Firm* — Coats & Bennett, PLLC

(57) ABSTRACT

Methods of determining for a vehicle a three-dimensional path that extends between an origin and a destination. The paths are determined based on the vehicle having a limited amount of energy that is not resupplied during travel. The paths are further determined based on the vehicle arriving at the destination with a predetermined amount of remaining energy.

20 Claims, 14 Drawing Sheets

(56) References Cited

U.S. PATENT DOCUMENTS

| | | |
|---|---|---|
| 2018/0001788 A1 | 1/2018 | Geuß et al. |
| 2018/0081360 A1 | 3/2018 | Bostick et al. |
| 2018/0283896 A1 | 10/2018 | Piemonte et al. |
| 2019/0063937 A1 | 2/2019 | Moore et al. |

FOREIGN PATENT DOCUMENTS

| | | | | |
|---|---|---|---|---|
| CN | 107389076 A | * | 11/2017 | ............. G01C 21/26 |
| DE | 102014204354 A1 | * | 9/2015 | ............. B60W 30/18 |
| EP | 2182323 A1 | * | 5/2010 | ............. G01C 21/32 |
| JP | 2004125430 A | * | 4/2004 | |

\* cited by examiner

SYSTEM AND METHOD FOR DETERMINING A THREE-DIMENSIONAL TRAVEL PATH FOR A VEHICLE

TECHNICAL FIELD

The present disclosure relates generally to the field of energy resource management, and more particularly to systems and methods for determining a travel path for a vehicle traveling across a three-dimensional space.

BACKGROUND

Certain vehicles such as an aircraft and watercraft move along a three-dimensional path during travel. These vehicles are not constrained to predefined paths that occur for land vehicles such as cars, trucks, and trains. The three-dimensional travel path allows for variation in the travel path along one or more latitude, longitude, and elevation. This provides for a variety of options for these vehicles when traveling between an origin and a destination. For example, one path option can include a greater altitude with a given latitude and longitude. Another path option includes a lesser altitude with the same latitude and longitude. Variations in different path options can also include differences in the latitude and/or longitude.

Vehicles include an energy source that supplies energy to one or more engines that propel the vehicle. Examples of vehicle fuel sources include one or more tanks that contain jet fuel and a battery that supplies electrical power. The fuel sources generally hold a finite amount of energy thus limiting the range of the vehicle during travel. Further, other factors affect the range of the vehicle during the travel, such as various weather conditions. Such factors often lead to "range anxiety" for the vehicle operators, which is the concern over whether a vehicle has a sufficient amount of energy to reach its destination.

BRIEF SUMMARY

One aspect is directed to a method of determining a three-dimensional path for a vehicle traveling from an origin to a remote destination. The method comprises: determining a plurality of different three-dimensional paths that extend between the origin and the destination; for each of the three-dimensional paths, determining an expected energy usage of the vehicle to travel the path and adjusting the expected energy usage based on one or more sensor readings that affect the travel; and for each of the paths, determining an expected energy reserve which is an expected amount of energy remaining in the vehicle upon reaching the destination.

In another aspect, the method further comprises dividing a three-dimensional space between the origin and the destination into a plurality of three-dimensional segments with each of the three-dimensional paths extending through a plurality of the three-dimensional segments.

In another aspect, the method further comprises for each of the paths: determining the three-dimensional segments that are included in the path; for each of the three-dimensional segments, determining the expected energy usage to travel the three-dimensional segment; for each of the three-dimensional segments, adjusting the expected energy usage based on the one or more sensor readings; and summing the expected energy usage for each of the three-dimensional segments and determining the expected energy usage used to travel the path.

In another aspect, the method further comprises determining the expected energy usage to travel the three-dimensional segment based on data from previous travel within the three-dimensional segment.

In another aspect, the method further comprises after traveling through each of the three-dimensional segments along the selected path, updating the expected energy usage.

In another aspect, the method further comprises after traveling through each three-dimensional segment, updating the travel data to include an actual energy usage of the vehicle traveling along the three-dimensional path through the three-dimensional segment.

In another aspect, the method further comprises receiving at least one of the sensor readings from one or more sensors on the vehicle.

In another aspect, the method further comprises receiving at least one of the sensor readings from one or more sensors positioned at the destination.

In another aspect, the method further comprises during the travel along the selected three-dimensional path determining that the expected amount of energy remaining in the vehicle upon reaching the destination will be less than the predetermined amount and changing the three-dimensional path to the destination.

In another aspect, the method further comprises after traveling the selected path, updating the travel data to include an actual energy usage of the vehicle traveling the three-dimensional path.

In another aspect, the method further comprises selecting for the travel one of the three-dimensional paths in which the expected energy reserve is greater than a predetermined amount.

One aspect is directed to a method of determining a three-dimensional path for a vehicle traveling from an origin to a remote destination. The method comprises: determining a plurality of different three-dimensional paths that extend between the origin and the destination; for each of the paths, determining an expected energy reserve which is an expected amount of energy remaining in the vehicle upon reaching the destination with the expected energy reserve based on data of previous travel along the path; selecting for the travel one of the three-dimensional paths in which the expected energy reserve is greater than a predetermined amount; and updating the data of the previous travel after traveling along the path.

In another aspect, the method further comprises for each of the paths: dividing the path into multiple three-dimensional segments; for each of the three-dimensional segments, determining an expected energy usage to travel the three-dimensional segment; summing the expected energy usage for each of the three-dimensional segments and determining the expected energy usage used to travel the path; and based on the summed expected energy usage, determining the expected energy reserve for the path.

In another aspect, the method further comprises updating the expected energy usage of the path after traveling through each of the three-dimensional segments.

In another aspect, the method further comprises while traveling along the path determining that the expected energy usage of the path is greater than an expected amount and adjusting the path.

In another aspect, the method further comprises adjusting the expected reserve for each of the paths based on one or more sensor readings that affect the travel.

One aspect is directed to a computing device configured to manage an energy source for a vehicle traveling between an origin and a destination. The computing device comprises a communications interface configured to communicate with the vehicle. The computing device also comprises processing circuitry configured to: generate a plurality of different three-dimensional paths that extend between the origin and the destination; for each of the three-dimensional paths, determine an expected energy usage of the vehicle to travel the path based on previous travel data along the path that is stored in a database; for each of the three-dimensional paths, adjust the expected energy usage based on one or more sensor readings that affect the travel; and for each of the three-dimensional paths, determine an expected energy reserve which is an expected amount of energy remaining in the vehicle upon reaching the destination.

In another aspect, the processing circuitry is further configured to select for the travel one of the three-dimensional paths in which the expected energy reserve is greater than a predetermined amount.

In another aspect, the processing circuitry is further configured to divide a three-dimensional space between the origin and the destination into a plurality of three-dimensional segments with each of the three-dimensional paths extending through a plurality of the three-dimensional segments.

In another aspect, the processing circuitry is further configured to: determine the three-dimensional segments that are included in the path; for each of the three-dimensional segments, determine the expected energy usage to travel the three-dimensional segment; for each of the three-dimensional segments, adjust the expected energy usage based on the one or more sensor readings; and sum the expected energy usage for each of the three-dimensional segments and determining the expected energy usage used to travel the path.

The features, functions and advantages that have been discussed can be achieved independently in various aspects or may be combined in yet other aspects, further details of which can be seen with reference to the following description and the drawings.

DETAILED DESCRIPTION

The present application is directed to methods of determining for a vehicle a three-dimensional path that extends between an origin and a destination. The vehicle has a limited amount of energy that is not resupplied during travel. Further, the vehicle should arrive at the destination with a predetermined amount of remaining energy, referred to as reserve energy.

Figure 1:
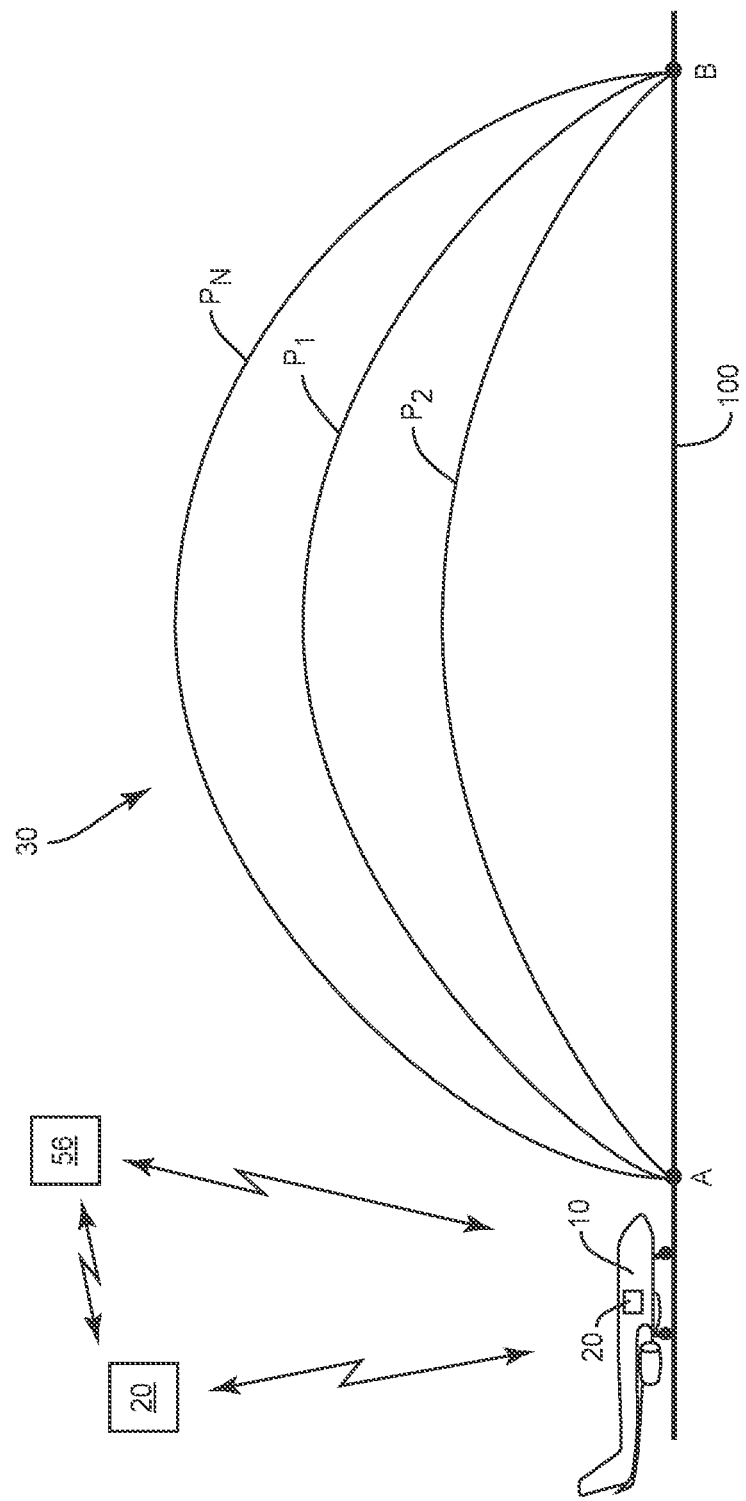
FIG. 1 schematic diagram of a multiple paths that extend between an origination and a destination.

FIG. 1 illustrates different paths P1, P2, . . . , PN that a vehicle 10 can travel through a three-dimensional space 30 from an origin A to reach a destination B. The vehicle 10 includes an energy source that supplies energy to one or more engines to propel the vehicle 10 during the travel. The storage capacity of the energy source is limited. Further, the vehicle 10 and/or travel is such that the energy source cannot be resupplied during the travel. In one example, the vehicle 10 is an aircraft configured for flight over terrain 100. Examples include but are not limited to manned aircraft, unmanned aircraft, manned spacecraft, unmanned spacecraft, manned rotorcraft, unmanned rotorcraft, satellites, rockets, missiles, manned terrestrial vehicles, unmanned terrestrial vehicles, and combinations thereof. In another example, the vehicle 10 is a watercraft configured for underwater movement. Examples include but are not limited to manned water borne vehicles, unmanned water borne vehicles, torpedoes, submarines, rockets, missiles, and combinations thereof.

Figure 2:
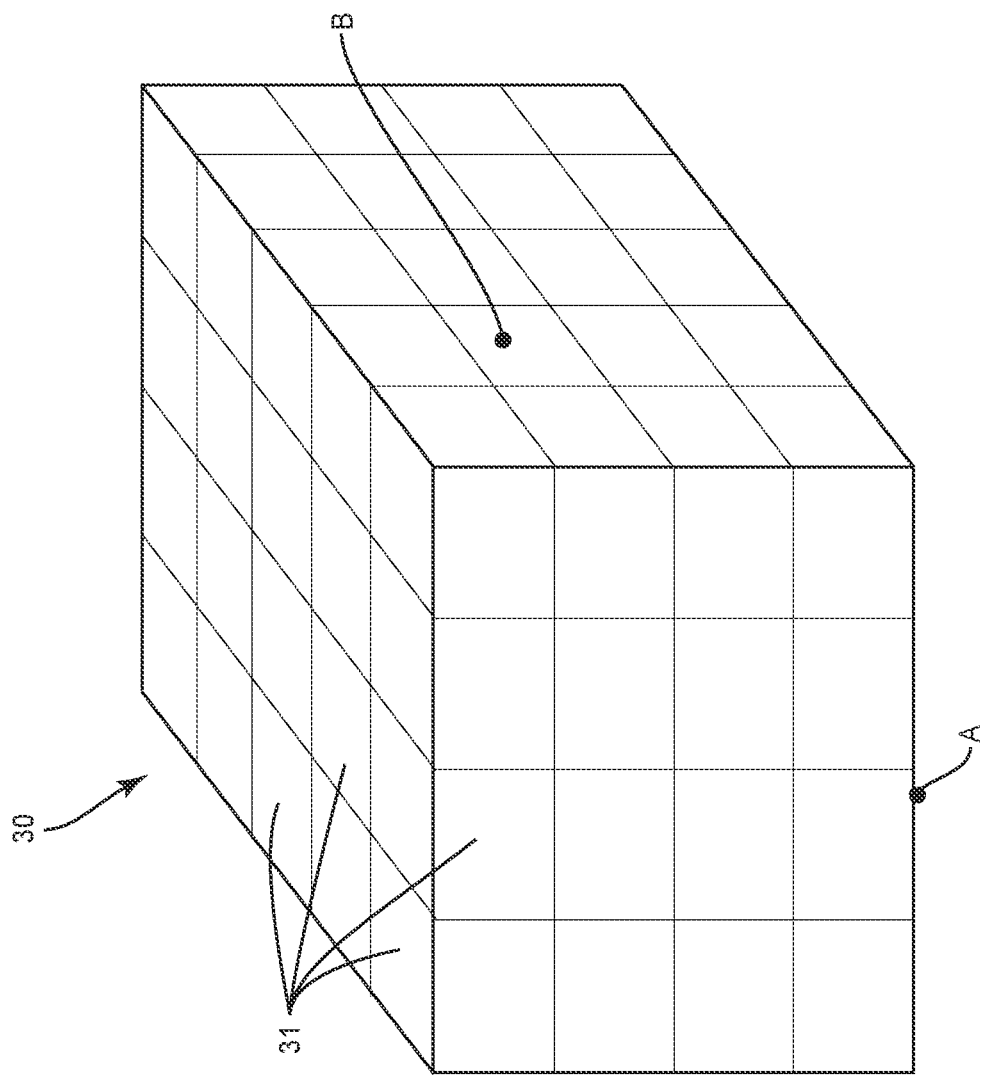
FIG. 2 is a schematic diagram of three-dimensional space that extends between an origination and a destination.

FIG. 1 illustrates the space 30 between the origin A and destination B in two dimensions. The actual space 30 is three-dimensional and can include various shapes and sizes. FIG. 2 illustrates one example with the three-dimensional space 30 illustrated as a cuboid having rectangular-shaped sides. The three-dimensional space 30 is sized with the origin A located on one side and the destination B located on a second side. The travel paths can extend completely through the three-dimensional space 30 with the entry and exit on opposing sides, or partially through the three-dimensional space 30 with the entry and exit on adjacent sides.

Figure 3:
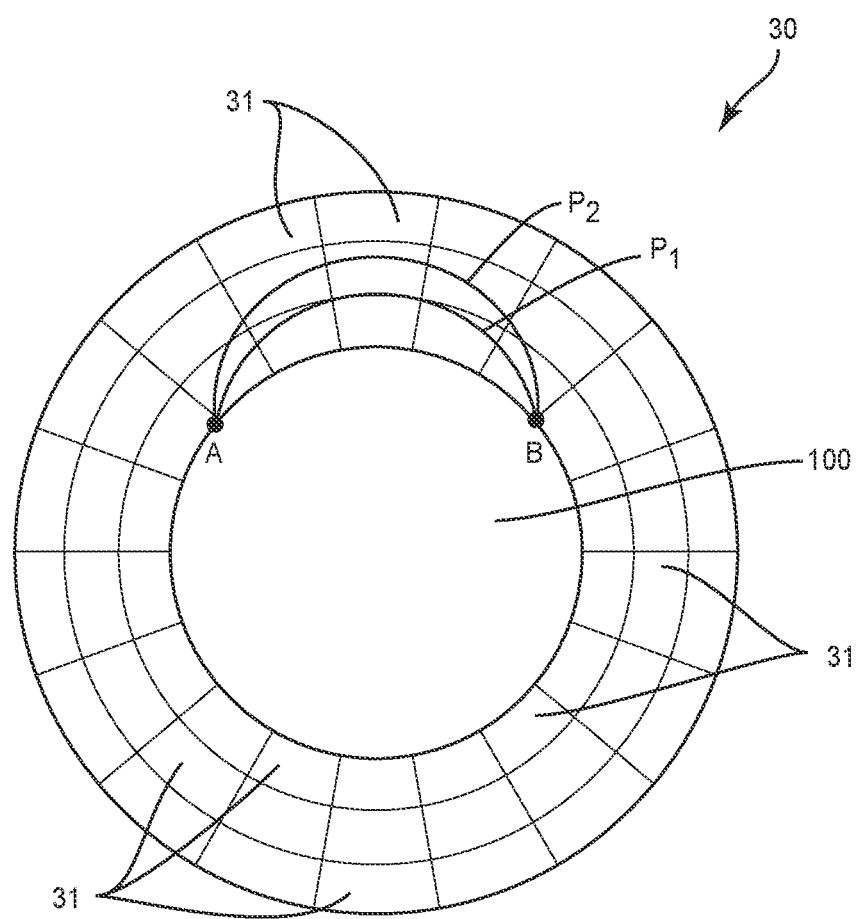
FIG. 3 schematic diagram of paths that extend through segments between an origination and a destination.

The three-dimensional space 30 is divided into different segments 31. Each of the segments 31 extends over a three-dimensional area. The segments 31 include various shapes and sizes. In one example as illustrated in FIG. 2, each of the segments includes the same rectangular shape and size. In another example as illustrated in two dimensions in FIG. 3, the space 30 extends above the surface of the terrain 100 (e.g., Earth) and is divided into zones that include a slight curve to correspond to the curvature of the Earth. Each of the zones includes segments 31 of various shapes in sizes. Each of the various paths through the three-dimensional space 30 extends through two or more of the segments 31.

One or more computing devices 20 provide for determining one or more paths that can be used by the vehicle 10 to travel from the origin A to the destination B. In one example, the computing device 20 is located at a remote location away from the vehicle 10, such as a remote server. In another example, the computing device 20 is located within the vehicle 10. In another example, computing devices 20 are located at both a remote location and on the vehicle 10.

The computing device 20 generates one or more paths that allows for the vehicle 10 to reach the destination B with the predetermined amount of reserve energy. This reserve energy allows for the vehicle 10 to reach the destination B in the event of changes in expected energy consumption. For example, weather conditions that occur during the travel could result in lower energy efficiency thus requiring the use of more energy during the travel. In another example, the vehicle 10 detours around a section of the three-dimensional space 30 during the travel thus resulting in a longer travel distance. The extra energy allows for these unforeseen changes and still allows for reaching the destination B.

Figure 4:
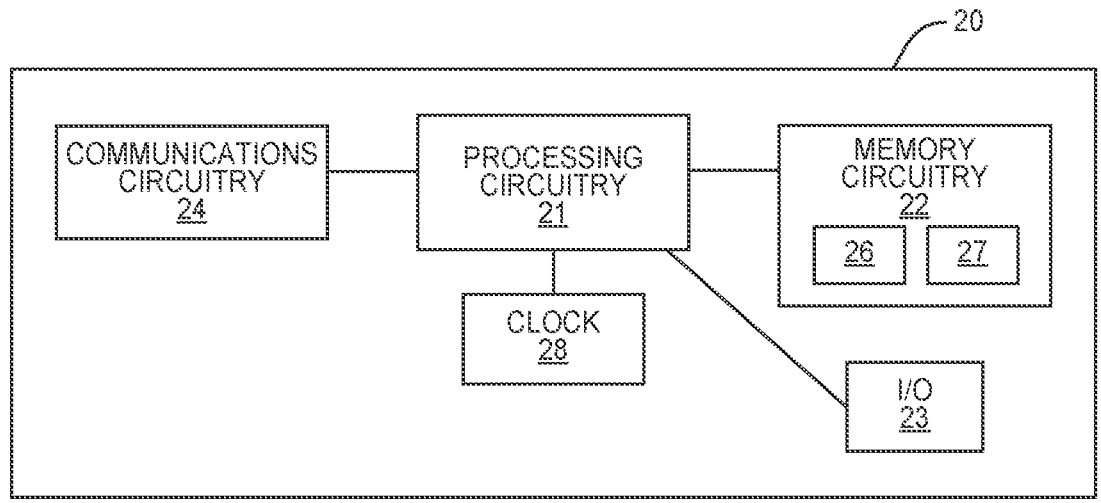
FIG. 4 is a schematic diagram of a computing device.

FIG. 4 is a functional block diagram of a computing device 20 configured to determine possible paths for traveling between an origination A and a destination B. The computing device 20 comprises processing circuitry 21, memory circuitry 22, a user input/output (I/O) interface 23, communications circuitry 24, and an energy consumption database 27.

The processing circuitry 21 is communicatively coupled via one or more buses to memory circuitry 22, I/O interface 23, and communications circuitry 24. The processing circuitry 21 can include one or more microprocessors, microcontrollers, hardware circuits, discrete logic circuits, hardware registers, digital signal processors (DSPs), field-programmable gate arrays (FPGAs), application-specific integrated circuits (ASICs), or a combination thereof. In one example, the processing circuitry 21 includes programmable hardware capable of executing software instructions stored, e.g., as a machine-readable computer control program 26 in memory circuitry 22. More particularly, the processing circuitry 21 is configured to execute the control program 26 to determine the possible paths P and the expected amount of fuel usage when traveling between the origin A and the destination B. The processing circuitry 21 is configured to implement this functionality in accordance with the data and information stored in the energy consumption database 27. The energy consumption database 27 is stored in a non-transitory computer readable storage medium (e.g., an electronic, magnetic, optical, electromagnetic, or semiconductor system-based storage device). The database 27 can be local or remote relative to the computing device 20. In one example, the database 27 is incorporated is stored in the memory circuitry 22.

A clock 28 measures various timing requirements regarding the travel of the vehicle 10. The clock 28 can be incorporated with the processing circuitry 21, or can be a separate component independent from the processing circuitry 21 as illustrated in FIG. 4. In one example, GPS circuitry is used for timing information. Each of the vehicles includes GPS circuitry to track the location and the timing aspects of the travel.

The I/O interface 23 comprises circuitry configured to allow the computing device 20 to communicate with remote entities. The user I/O interface 23 can comprise a variety of different devices and/or circuitry. However, in one aspect, I/O interface 23 includes, but is not limited to, display devices such as a Liquid Crystal Display (LCD) and/or a Light Emitting Diode (LED) display for presenting visual information to a user located at the computing device 20 such as a worker at the remote location who is operating the vehicle 10, or a pilot within the vehicle 10. The I/O interface 23 can also include one or more graphics adapters, display ports, video buses, a touchscreen, a graphical processing unit (GPU), and audio output devices such as speakers, as well as circuitry and devices for accepting input from the user. Such input circuitry and devices include a pointing device (e.g., a mouse, stylus, touchpad, trackball, pointing stick, joystick), a microphone (e.g., for speech input), an optical sensor (e.g., for optical recognition of gestures), and/or a keyboard (e.g., for text entry). The user I/O interface 23 can be implemented as a unitary physical component, or as a plurality of physical components that are contiguously or separately arranged, any of which may be communicatively coupled to any other, or communicate with any other component via processing circuitry 21.

The communications circuitry 24 is configured to facilitate the communication with remote entities. In one example, the communications circuitry 24 includes a transceiver configured to send and receive communication signals through one or more wireless communications networks, satellites, and landline systems.

The computing device 20 can be located in one or both of the vehicle 10 and a remote location (e.g., remote server). In one example, the computing device 20 is located at a remote location away from the vehicle 10. In this example, the vehicle 10 includes an on-board computing device 20 that communicates with the remote computing device 20 via one or more of the wireless communications network, satellite, or landline system. The on-board computing device 20 determines data about the vehicle 10 (such as through one or more on-board sensors), provide the data to the computing device 20, and receive information and data from the computing device 20.

Figure 5:
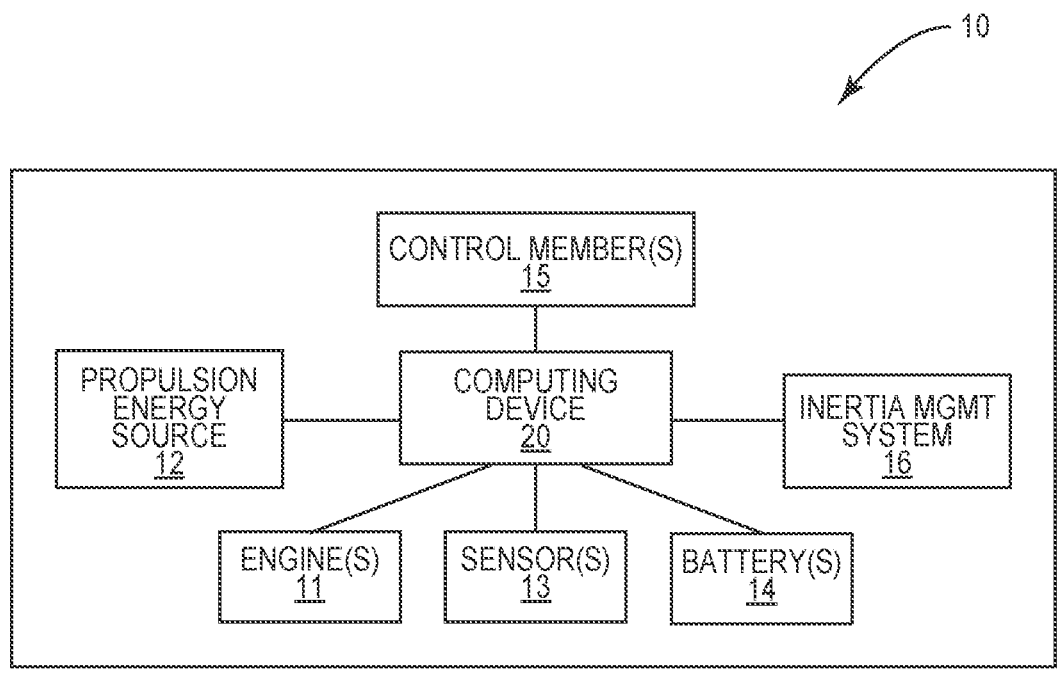
FIG. 5 is a schematic diagram of components of a vehicle.

FIG. 5 is a functional block diagram illustrating respective implementation architectures of the vehicle 10. The vehicle 10 includes one or more engines 11 that propel the vehicle 10 during travel. Examples of engines 11 include but are not limited to piston engines or gas turbines that rotate one or more propellers, jet engines, and rocket engines. A propulsion energy source 12 provides energy to power the one or more engines 11. The propulsion energy source 12 includes various types of energy, such as but not limited to a battery power (measured in Watt-Hours), combustible liquid energy (measured in gallons), combustible gaseous energy (measured in pounds), and electrical fuel cell energy (measured in moles).

One or more control members 15 are positioned on the exterior of the vehicle 10 and are configured to control the movement of the vehicle 10. Each control member 15 includes one or more surfaces that are moved as necessary relative to a main body of the vehicle 10 to adjust the orientation to adjust the direction of travel. In aircraft, control members 15 can be positioned at various locations such as the wings and tail and include but are not limited to a rudder, elevators, ailerons, wing leading and trailing edge devices, and spoilers. In watercraft, examples include rudders and hydroplanes.

The computing device 20 oversees operation of the vehicle 10. The computing device 20 can including processing to calculate the travel path and adjustments based on data stored in the energy consumption database 27. The computing device 20 can also be configured to receive and carry out instructions from a remote computing device 20. A battery 14 provides energy for operating the computing device 20 and one or more electrical components in the vehicle 10, referred to as avionics energy.

On-board sensors 13 provide information used to determine the one or more paths and to update the energy consumption database 27. Sensors 13 can determine the environmental conditions at the vehicle 10, such as but not limited to temperature, humidity, and wind speed. Sensors 13 can also determine aspects about the vehicle 10 during travel, such as orientation, velocity, altitude, and location (i.e., GPS circuitry). Sensors 13 can also determine the quantity of energy remaining in the propulsion energy source 12 and avionics energy left in the battery 14. An inertia management system 16 is configured to determine acceleration, spin rate, and magnetic measurements of the vehicle 10 in three dimensions.

Figure 6:
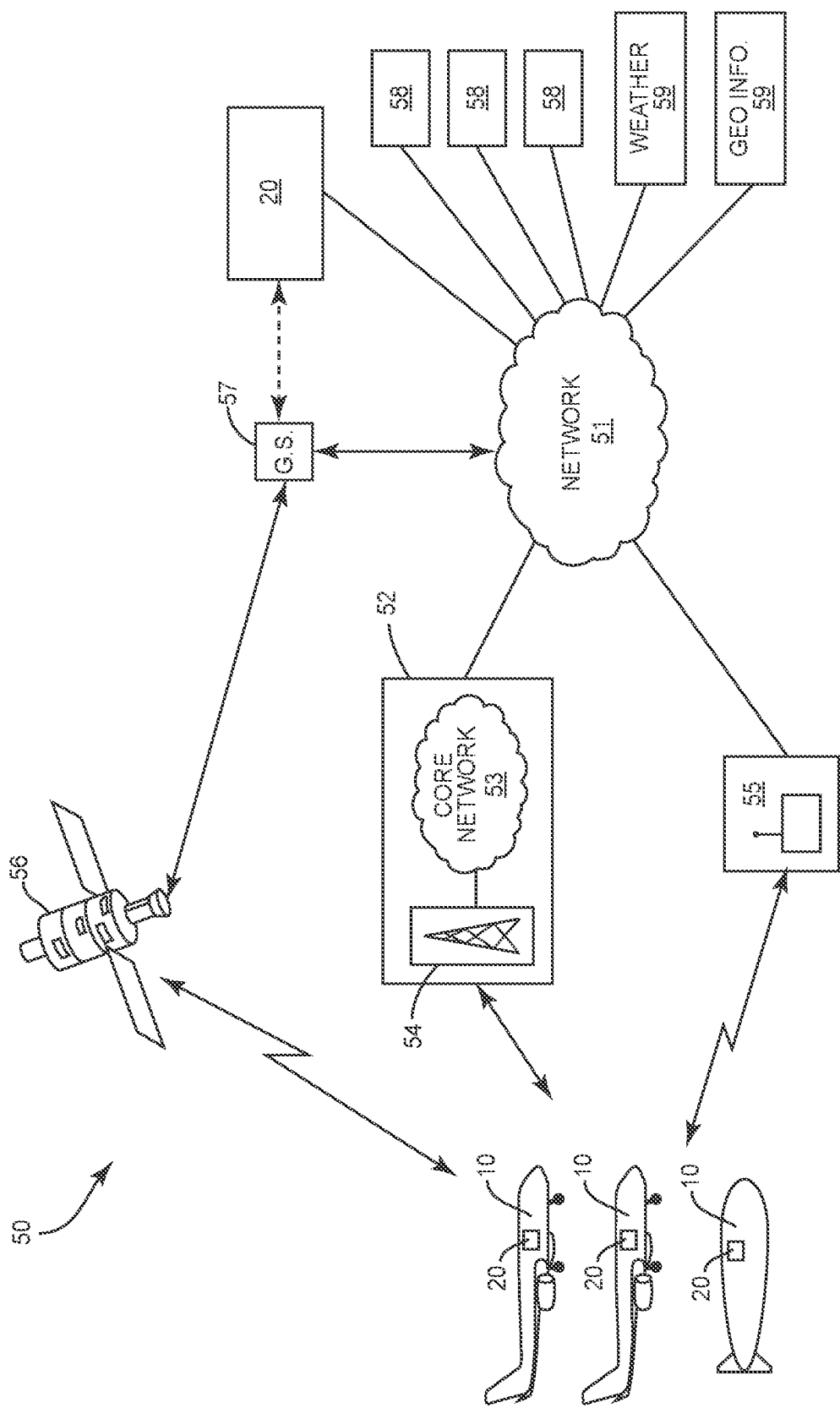
FIG. 6 is a schematic diagram of a wireless communication network through which vehicles and a remote computing device communicate.

Communications between a vehicle 10 and remote computing device 20 occur through a wireless communication network 50 as illustrated in FIG. 6. The wireless communication network 50 includes a packet data network (PDN) 51. The PDN 51 can include a public network such as the Internet, or a private network. The wireless communications network 50 can include a mobile communication network 52 (e.g., a WCDMA, LTE, or WiMAX network). The mobile communication network (MCN) 52 includes a core network 53 and a radio access network (RAN) 54 including one or more base stations. The MCN 52 can be a conventional cellular network operating according to any communication standards now known or later developed. For example, the MCN 52 can comprise a Wideband Code Division Multiple Access (WCDMA) network, a Long Term Evolution (LTE) network, or WiMAX network. The MCN 52 is further configured to access the packet data network (PDN) 51.

The wireless communication network 50 also provides for communication through a Wireless Local Area Network (WLAN) 55 that operates according to the 802.11 family of standards, which is commonly known as a WiFi interface.

In one example with marine vehicles that are submerged during travel, communications occur with ELF or VLF radio waves that use low frequencies that penetrate the water.

Communications can also be available through one or more satellites 56. In one example after the vehicle 20 has left the origin A, satellite communication is the main mode of communication. The satellites 56 can communicate to the computing device 20 through one or more of ground stations 57. The ground stations 57 can communicate directly with the computing device 20 or through the PDN 51.

The computing device 20 is configured to determine one or more paths P for the vehicle 10 to travel from the origination A to the destination B. The range of the vehicle 10 is limited by the amount of energy available from the propulsion energy source 12 which cannot be recharged during the travel. The range is further limited by the need to have a predetermined amount of reserve energy when the vehicle 10 arrives at the destination point B.

In one example, the computing device 20 uses data from the energy consumption database 27 to determine path options for the travel. The database 27 is initialized by traveling specific routes under known conditions and then combining this information with later travels. This information is then used by the computing device 20 to estimate the expected fuel usage for traveling along a similar path at some point in the future. For example, when determining path options between points A and B, computing device 20 accesses the database 27 and retrieves data from the same or similar travels that have previously occurred. Based on this data, the computing device 20 can determine current path options.

Figure 7:
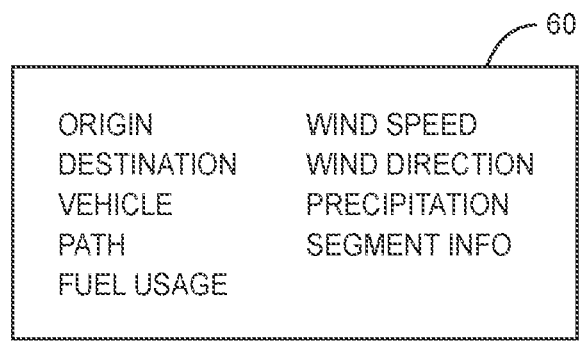
FIG. 7 is a diagram of a record of information included in a database.

The database 27 can include various types of information about the travel. FIG. 7 illustrates a record 60 that is added to the database 27 during and/or after travel along a path. The record contains various information including but not limited to origin, destination, vehicle type, path of travel, fuel usage, wind speed, wind direction, and precipitation. This data can be stored for the entire path of travel, and/or for the various segments 31 that form the travel path.

Figure 8:
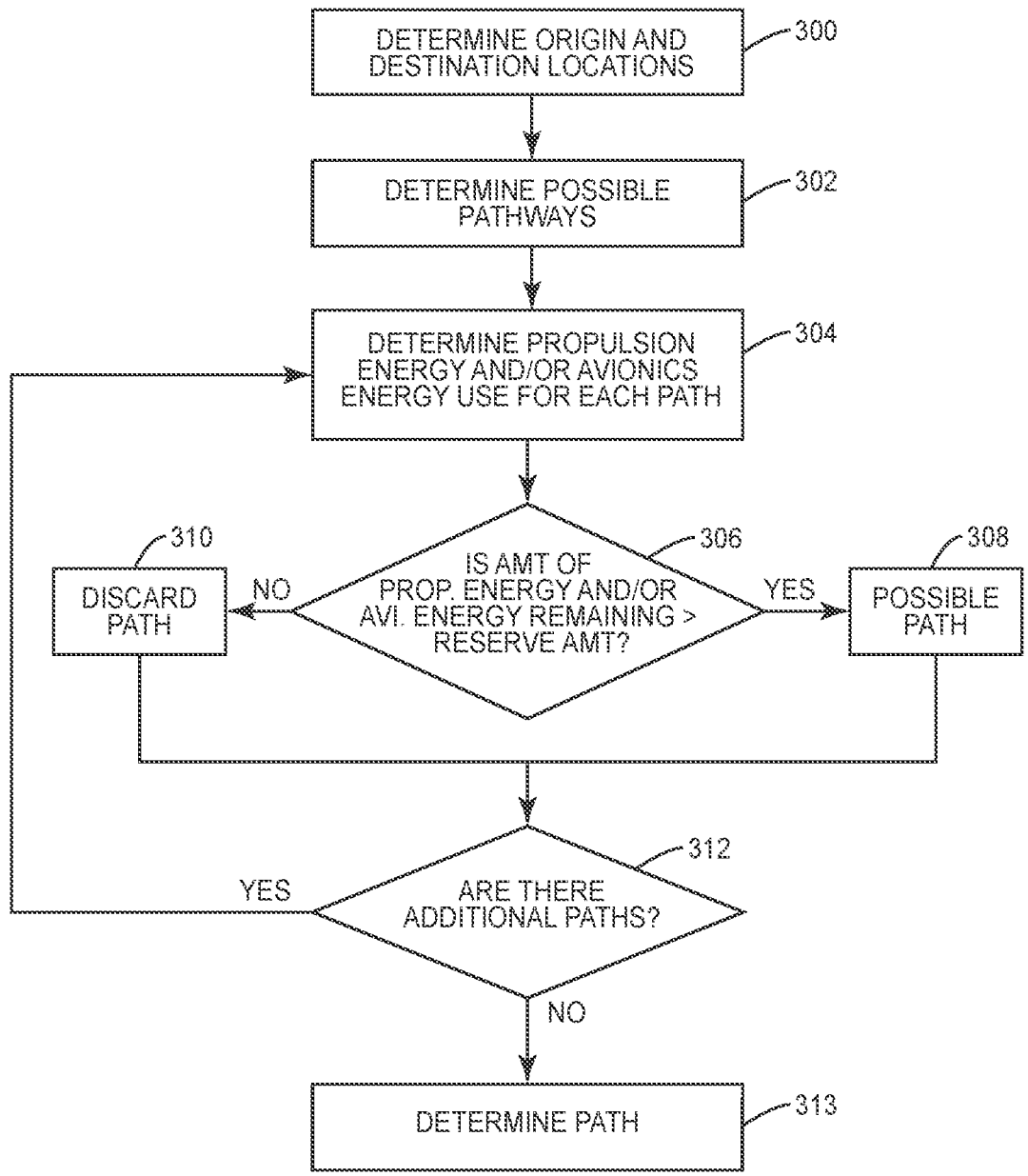
FIG. 8 is a flowchart diagram of a method of determining one or more paths for travel between an origin and a destination.

FIG. 8 illustrates one method of determining one or more paths. The method includes determining the origination and destination locations (block 300). These can be received from a user on the vehicle 10, a user at the remote location, or other user that is able to input information through the wireless communication network 50 or other means. One or more paths are determined as possible options for the travel (block 302). For each option, the quantity of propulsion energy and/or avionics energy used for the travel is calculated (block 304). In one example, each of the possible paths P consumes a different quantity of propulsion energy and/or a different quantity of avionics energy. For each path, the calculated amount of reserve for one or more of the energies is determined for when the vehicle 10 reaches the destination B. In one example, this includes subtracting the expected amount of energy usage from a starting amount of energy.

If the remaining one or more energies are at or above the reserve amounts (block 306), then the path is a possible option for the travel (block 308). If the calculated amount for travel results in the one or more energies being below a predetermined amount, then the path is not an option for the travel (block 310). The process continues to determine one or more possible paths for the travel (block 312).

Once the possible paths are determined, one of the paths P is selected for the travel (block 313). The selection of one of the paths can be based on various criteria. In one example, the path that results in the most energy remaining upon reaching the destination B is selected as the path. In another example, the fastest path is selected. In another example, the path P that has been most commonly used in previous travel is selected. In another example, the user simply selects one of the paths.

The method of determining the possible paths can take into consideration one or both of the amount of propulsion energy and the amount of avionics energy remaining upon reaching the destination. In one example, just the amount of propulsion energy is used to determine the possible paths. In another example, just the amount of avionics energy is used to determine the possible paths.

Figure 9:
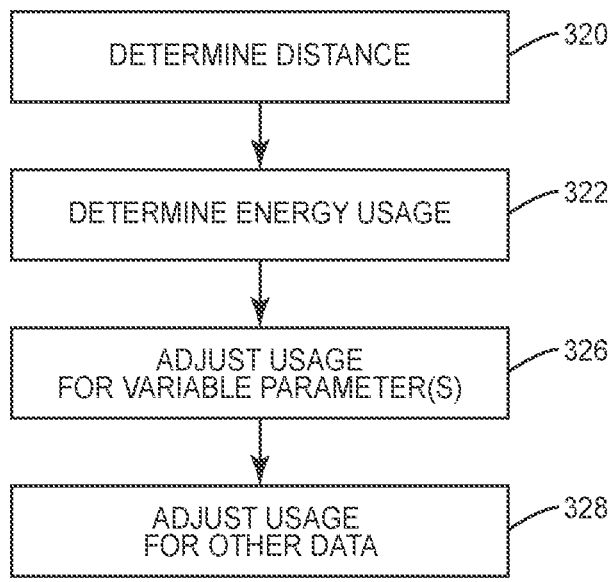
FIG. 9 is a flowchart diagram of determining energy usage.

The method of determining the expected propulsion energy and/or avionics energy usage for each path can be calculated in one or more different manners. FIG. 9 illustrates one method that includes determining the distance of travel along the path P (block 320). The travel distance accounts for the distance along the trajectory between the origin A and destination B. The amount of energy needed for traveling the distance is calculated based on fixed parameters of the vehicle 10 (block 322). Parameters include but are not limited to the amount of drag of the vehicle 10 during the travel, the vehicle weight, and the efficiency of the vehicle with the type of energy.

The expected energy usage is adjusted based on one or more variable parameters (block 326). One type of variable parameter is the conditions determined from the sensors 13 on the vehicle 10. Examples include but are not limited to the temperature at the origin A, precipitation at the origin, and the amount and direction of wind at the origin A. Variable parameters can also include conditions sensed by one or more remote sensors 58 that are positioned along the path and/or destination B. As illustrated in FIG. 6, the sensors 58 can be accessed through the wireless communication network 50. The sensors 58 can provide weather conditions such as wind speed, wind direction, temperature, and precipitation. Energy usage can also be adjusted based on other data from one or more other sources 59 (block 328). The sources 59 are accessible through the wireless communication network 50 and can include various information such as elevation changes between the origin A and destination B for a flight, and the amount of ice in the water at points between the origin A and destination B for an underwater vehicle. For the various adjustment parameters (blocks 326, 328), the expected energy usage is not adjusted if no information is available for the various data.

Figure 10:
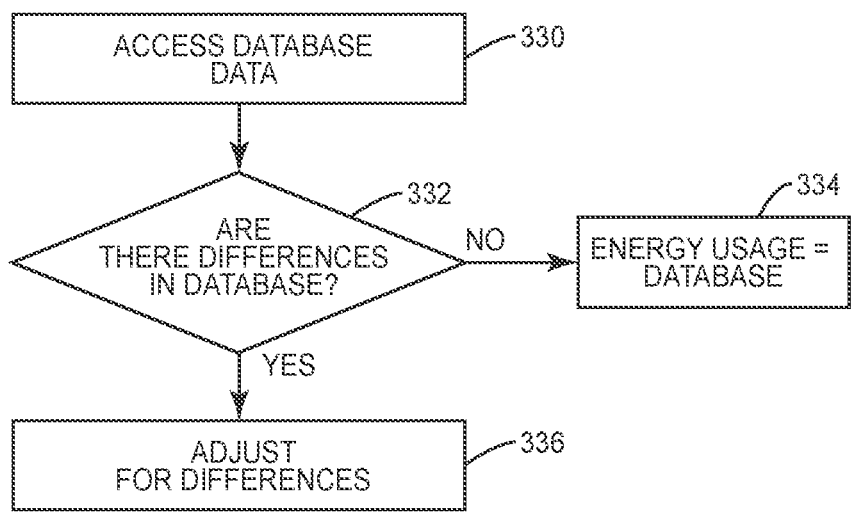
FIG. 10 is a flowchart diagram of using data from previous travel to determine an expected energy usage for a path.

FIG. 10 illustrates a method of using the data from previous travel that is stored in the database 27 to determine the expected energy usage for a path (block 330). The computing device 20 determines whether there are differences between the data stored in the database 27 and the information for the requested travel (block 332). If the information stored in the database 27 matches the request, the expected energy usage is determined to be the same as the stored data (block 334). For example, the data is used as is when it is for the same trajectory and origin A and destination B, and for the same vehicle, and for the same weather conditions.

If there are differences between the travel and the data stored in the database 27, the computing device 20 adjusts the expected energy usage based on the differences (block 336). For example, an adjustment is made to account for wind speeds at the origin A and/or destination B that are different than the stored data. The computing device 20 applies an adjustment factor to the stored data to calculate the expected energy usage for the path. In another example, the data is for a different type of vehicle than that used for the current travel. In this example, the computing device 20 applies a factor to account for these differences and adjusts the expected energy usage based on the known vehicle differences (e.g., drag, energy efficiency).

Figure 11:
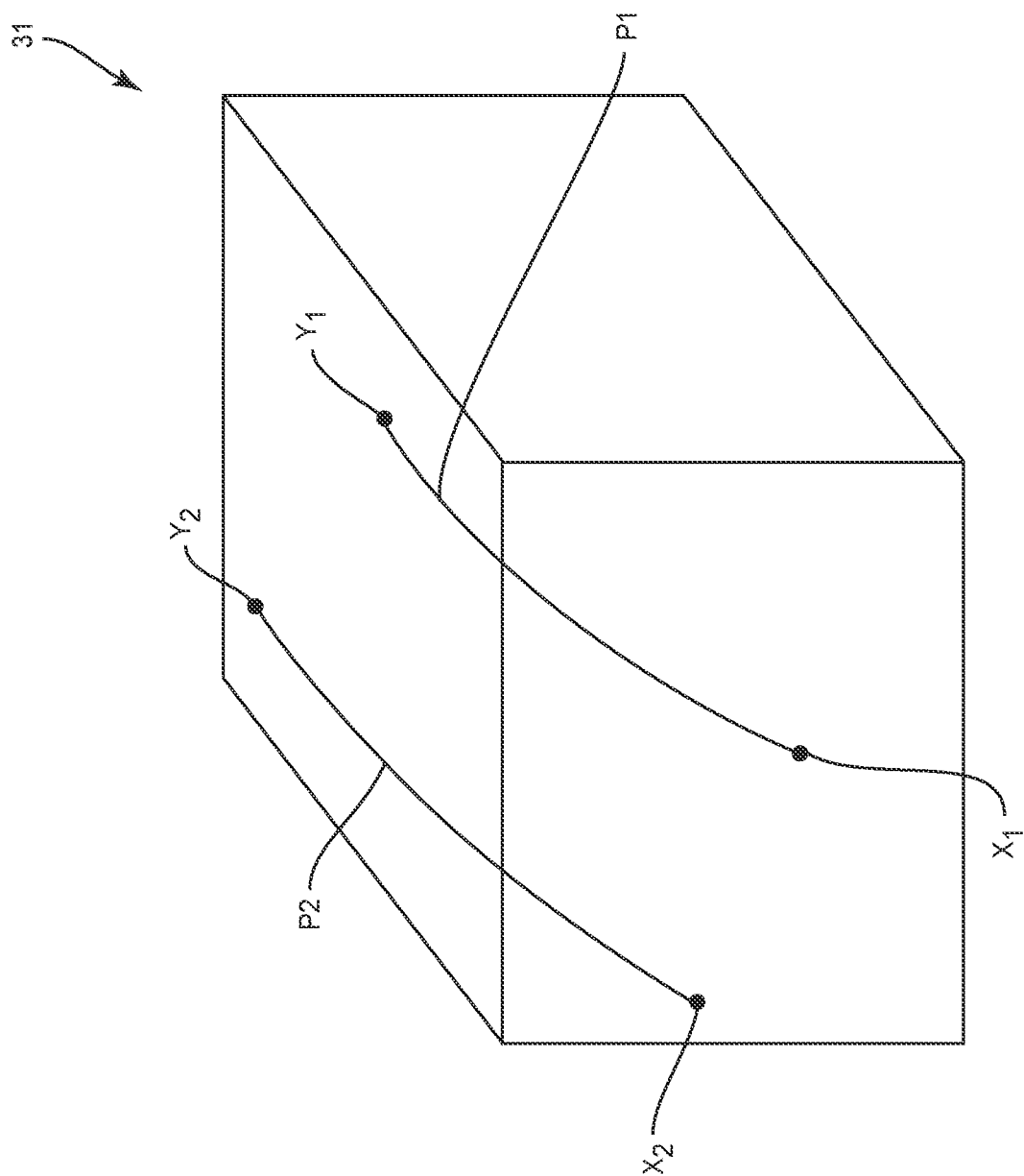
FIG. 11 is a schematic diagram of a three-dimensional segment through which paths extend.

In one example, the database 27 stores information about the entire path traveled between the origin A and the destination B. The adjustments for differences between the stored information and the current expected travel are then factored to the overall travel data. In another example, the analysis is performed on a segment-by-segment basis for a path to determine the expected energy usage. The expected energy usage for each segment 31 is calculated and then summed to determine the expected energy usage for the path. Using the segment 31 of FIG. 11 as an example, a first path P1 includes a first trajectory that enters the segment 31 at point X1 and exits at point Y1. A second path P2 includes a different second trajectory that enters the segment 31 at point X2 and exits at point Y2. The different trajectories through the segment 31 can include the same or different lengths and/or configurations. Various information can be stored in the database 27 regarding travel through the segment 31 for each of the various paths. Examples include but are not limited to distance traveled in the segment 31 along each path, entrance and exit angles for each path, and altitude or depth for each path.

The use of dividing the possible paths into segments 31 can provide for accurate energy consumption estimates. The use of segments 31 provides for the computing device 20 to determine average energy consumption at specific locations along the paths, and to use the averages to estimate the total energy consumption over the length of the path P.

In one example, the computing device 20 determines the expected energy usage for each of the segments 31. This can include determining the expected energy usage based on fixed parameters such as drag and energy efficiency. The determination can also include applying adjustments for variable parameters that can be sensed by one or more of the sensors 13, such as but not limited to air speed, wind speed, and precipitation. For each path, the expected energy usage for the segments 31 along the path is summed to determine an overall expected energy usage for the path.

Figure 12:
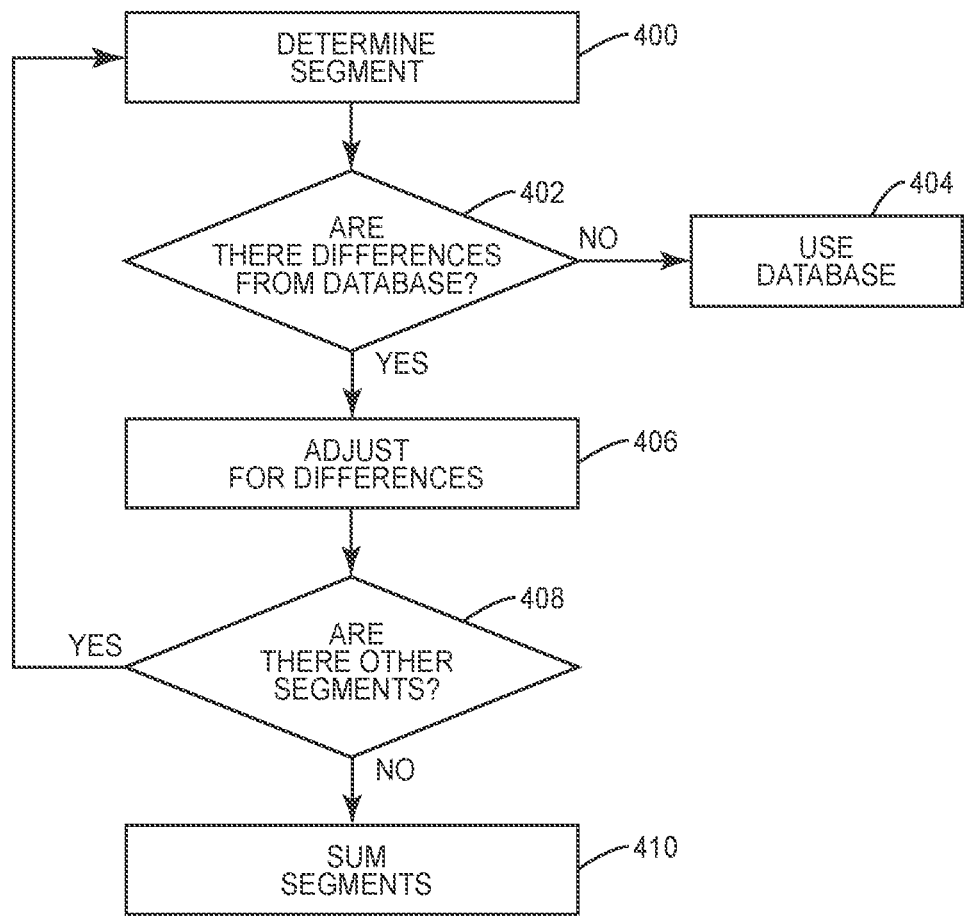
FIG. 12 is a flowchart diagram of a method of determining expected energy usage for travel along a path.

In another example, the computing device 20 determines the expected energy usage for the segments 31 based on data from the database 27. FIG. 12 illustrates a method of determining expected energy usage that includes dividing the path into the segments 31 and determining energy usage for each of the segments 31 (block 400). For each segment 31, the computing device 20 accesses the data in the database 27 and determines if there are differences (e.g., different vehicle, different trajectory, different weather conditions) (block 402). If the data matches the current travel path through the segment 31, the data is used to determine the expected energy usage for the segment 31 (block 404). If there are differences, the computing device 20 calculates adjustments to provide for a more accurate estimate (block 406). The process includes determining the expected energy usage for each of the segments 31 along the path (block 408). The expected energy usage for each of the segments 31 is summed to obtain the overall expected energy usage for the path (block 410).

In one example, an energy usage datum is saved for each segment 31. This datum is the expected energy usage for a vehicle 10 to travel through the segment 31 when traveling in a predetermined direction. The datum is determined based on historical information from previous travel through the segment 31. The expected energy usage for a path is the sum of the datums for each of the segments 31 along the path.

Figure 13:
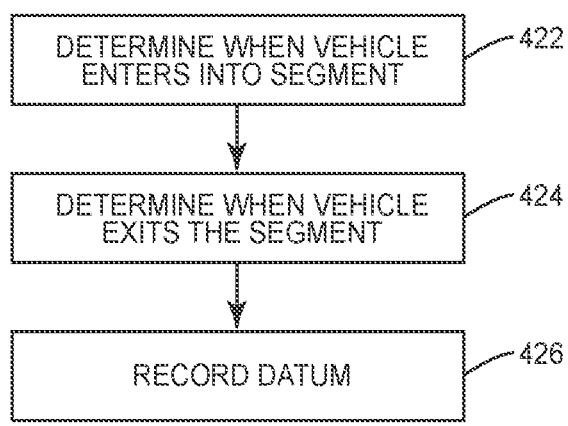
FIG. 13 is a flowchart diagram of a method of recording a datum for travel through a segment.

FIG. 13 illustrates a method of recording a datum for travel through a segment 31. For each segment 31, the computing device 20 monitors the vehicle and determines when the vehicle 10 enters into each segment 31 by crossing the segment boundary (block 422). The computing device 20 determines the time the vehicle 10 passes into the segment 31, the amount of remaining energy, the time of entry, and the location of entry. After passing through the segment 31, the computing device 20 also determines similar information about the exit (block 424). The computing device 20 uses the entry and exit information to record a datum regarding the segment 31 (block 426). The datum includes one or more aspects regarding the travel through the segment 31, including the direction of travel, duration of travel, vehicle speed, and one or more variables detected by the sensors 13 (e.g., wind speed, altitude, temperature). The direction of travel and the distance is determined through the entry and exit boundaries. The vehicle speed can include the average speed through the segment calculated as the duration of travel divided by the time in the segment 31.

The datum can also include the amount of energy consumed while traveling through the segment 31. This can be calculated based on the difference in the amount of energy when the vehicle 10 enters and exits the segment 31. The total energy consumed during the travel along the path P is the sum of the energy consumed for each segment 31 along the path P. The information for each segment 31 can then be used to estimate future travel between the origin A and destination B.

In another example, the computing device 20 updates the database 27 at one or more periodic times during the travel and/or when the travel is complete. This information can include the data shown in FIG. 7, and includes but is not limited to origin, destination, type of vehicle, path, fuel usage, and one or more weather conditions. The expected energy usage can also be saved in the database 27 and compared to the actual results.

Figure 14:
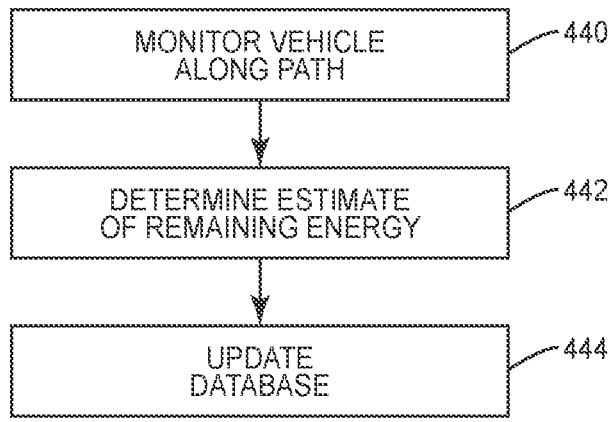
FIG. 14 is a flowchart diagram of a method of monitoring energy usage during travel.

During the travel along the selected path, the computing device 20 monitors the energy usage of the vehicle 10. FIG. 14 illustrates one method in which the computing device 20 monitors the vehicle 10 as it travels along the path P (block 440). For an autonomous vehicle 10, the computing device 20 can adjust one or more of the flight control members 15 or adjusting the one or more engines 11 to maintain travel along the path P. For a manned vehicle 10, the computing device 20 can signal the user of any deviations off the path P.

During travel, the computing device 20 periodically determines an estimate of the remaining energy (block 442). In one example, this includes determining a quantity of energy consumed and a remaining amount of energy. A calculation is also made of an estimate of the needed energy required to reach the destination B. This information is stored in the database 27 (block 444). In one example, this updated information allows for the computing device 20 and/or other computing devices 20 to more accurately determine fuel usage for future travel.

The remaining amount of energy can be displayed periodically or continuously during the travel. This includes a on a display in the vehicle 10 for a pilot, or at a remote location for a user that is monitoring the travel. In the event the remaining energy amount is less than a predetermined quantity, a warning can be emitted to notify persons of the condition and that the vehicle 10 may not reach the destination point B with the reserve energy amount.

Figure 15:
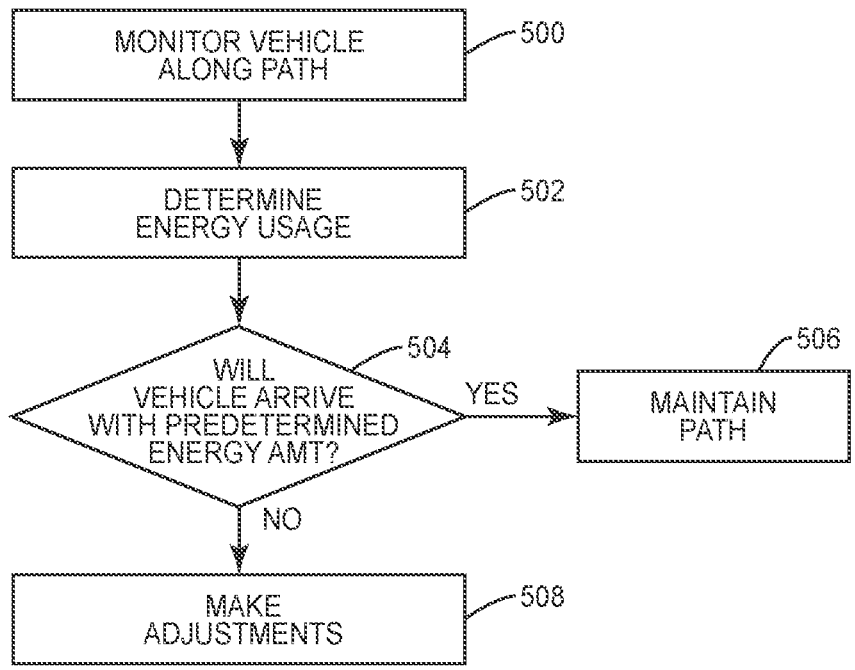
FIG. 15 is a flowchart diagram of a method of adjusting a path during travel.

In one example, the amount of actual energy usage may exceed the calculated expected energy usage. This can require adjustments to the path during the travel. FIG. 15 illustrates a method in which the energy usage is above the expected amount. During the travel, the computing device 20 monitors the vehicle 10 moving along the path P (block 500). The actual energy usage is determined at various times during the travel (block 502). This can include monitoring the readings from a sensor 13 located in the propulsion energy source 12, a sensor 13 monitoring the remaining charge on the battery 14, or can include calculating the actual energy usage based on fixed and variable parameters.

The computing device 20 determines whether the vehicle 10 will arrive at the destination B with the predetermined reserve amount of energy (block 504). In one example, this includes comparing the actual energy usage at a point along the path where the vehicle is currently located against an expected energy usage at the point. If the actual energy usage exceeds the expected amount, the computing device 20 determines that the vehicle 10 will not arrive with the predetermined reserve energy amount. In another example, the computing device 20 compares the amount of remaining energy with an expected amount of energy needed to reach the destination B. If this difference is less than the predetermined amount of needed remaining energy, the computing device 20 determines that the vehicle 10 will not arrive with the required predetermined reserve amount. In another example, the computing device extrapolates the calculated energy usage with the remaining amount of travel to determine if there will be the required reserve amount.

If the computing device 20 determines the vehicle 10 will arrive with the predetermined reserve amount, the current path is maintained (block 506). If the computing device 20 determines the vehicle 10 will not arrive with at least the reserve amount, one or more adjustments are made (block 508). In one example, the adjustment includes changing the path to reach the destination B. For example, an aircraft can change trajectory to a lower altitude. In another example, a watercraft can change trajectory to a shallower path. In another example, one or more operational aspects of the vehicle 10 are adjusted to conserve energy. Examples include slowing the one or more engines 11 and changing one or more of the control members 15 to reduce drag.

Figure 16:
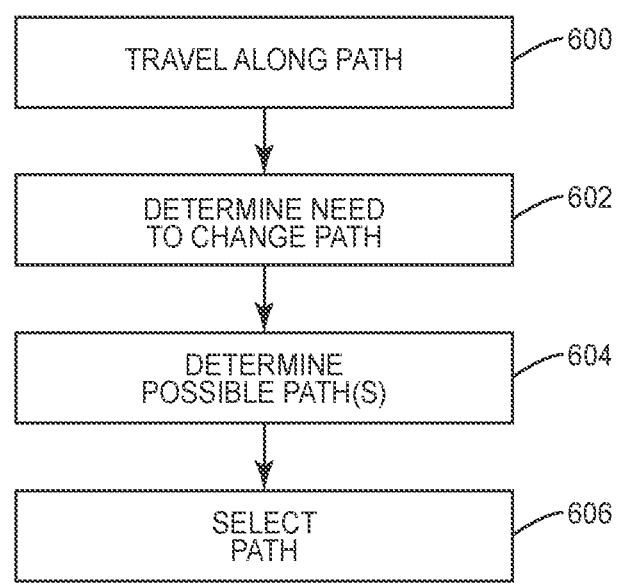
FIG. 16 is a flowchart diagram of a method of selecting a different path during travel along a first path.

In the various travel examples, the calculation of the path can occur at various times and with various methods. FIG. 16 illustrates a method in which an original path is determined for the vehicle 10 (block 600). At some point during the travel (i.e., after the vehicle 10 has left the origin A), it is determined that a new path is needed to reach the destination (block 602). The computing device 20 determines possible paths to reach the destination (block 604). For each possible path, the computing device 20 determines that the vehicle 10 will reach the destination with the reserve energy using one or more of the methods described above. A new path is selected either by the computing device 20 or received as an input from a user (block 606). The computing device 20 adjusts one or more of the control members 15 to adjust the course of the vehicle 10 to travel along the new path. In one example, the course adjustment to the new path occurs immediately at the time the path is selected. In another example, the new path is calculated as beginning at a predetermined location (e.g., 200 miles away from the destination B). Course adjustments are made at that point to alter the trajectory to the new path.

In one example, the destination is not known at the time of travel or changes during the travel. The process of changing the path during travel accounts for reaching the destination in these circumstances.

As described above, datums can be used to determine the expected energy usage for traveling along a path that extends through multiple different segments 31. Each segment 31 includes an energy usage datum of the expected energy usage for the vehicle 10 to travel through the segment 31. The total expected energy usage for the path is determined by summing the datums for each of the segments 31 that the path travels through. To ensure that the datums remain accurate, the computing device 20 monitors the difference between the datum and the actual energy usage.

Figure 17:
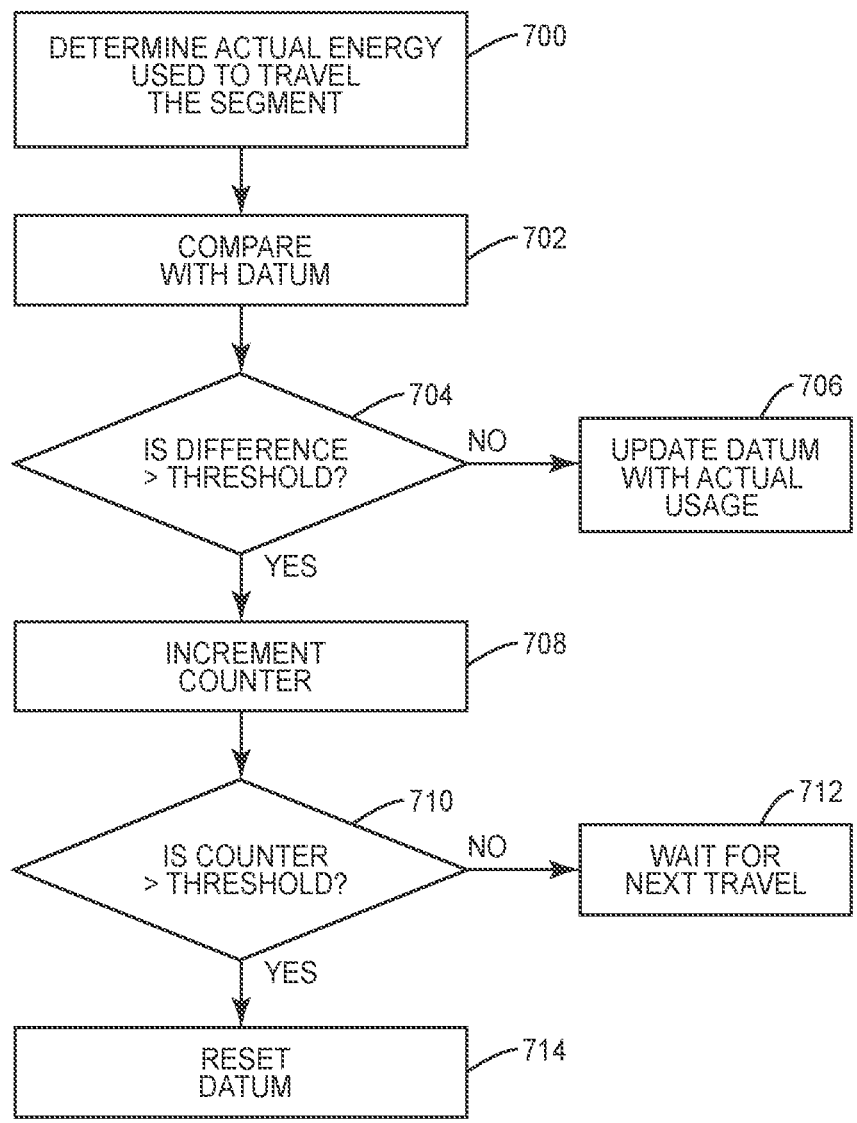
FIG. 17 is a flowchart diagram of a method of updating a datum for travel along a path.

FIG. 17 illustrates a method of updating the database 27 including the datum corresponding to one or more segments 31. The method includes after the vehicle 10 has traveled through the segment 31, determining the actual amount of energy used (block 700). The actual energy used in compared with the datum that includes the expected amount of energy that is needed to travel the segment (block 702). The computing device determines whether the difference between the expected and actual amounts exceeds a threshold (block 704). If the difference is not greater than the threshold, the calculated actual usage is added to the database 27 (block 706). In one example, the datum is an average of actual usage from previous travel through the segment 31 and this actual usage is averaged with the datum.

If the difference exceeds the threshold (block 704), a counter is incremented (block 708). The actual usage calculated for the travel could be an outlier caused by unexpected conditions (e.g., unusual weather conditions, inaccurate sensor reading). To prevent an outlier reading for adversely affecting an accurate datum, the counter maintains the number of times that an outlier condition occurs. The counter is monitored (block 710) and if it is below a threshold, the datum is not changed (block 712).

If the counter is greater than the threshold (box 710), then the datum is considered to no longer be an accurate estimate of the energy needed to travel through the segment 31. The datum is reset to a more accurate number (block 714). In one example, the reset is the actual energy used for the vehicle 10. In another example, an average of the last vehicles traveling through the segment 31 is used as the new datum.

The example of FIG. 17 is used for comparing a datum for a segment 31. In another example, a similar method is performed for comparing an expected energy usage for the entire path against an actual amount of energy consumed for the travel.

Figure 18:
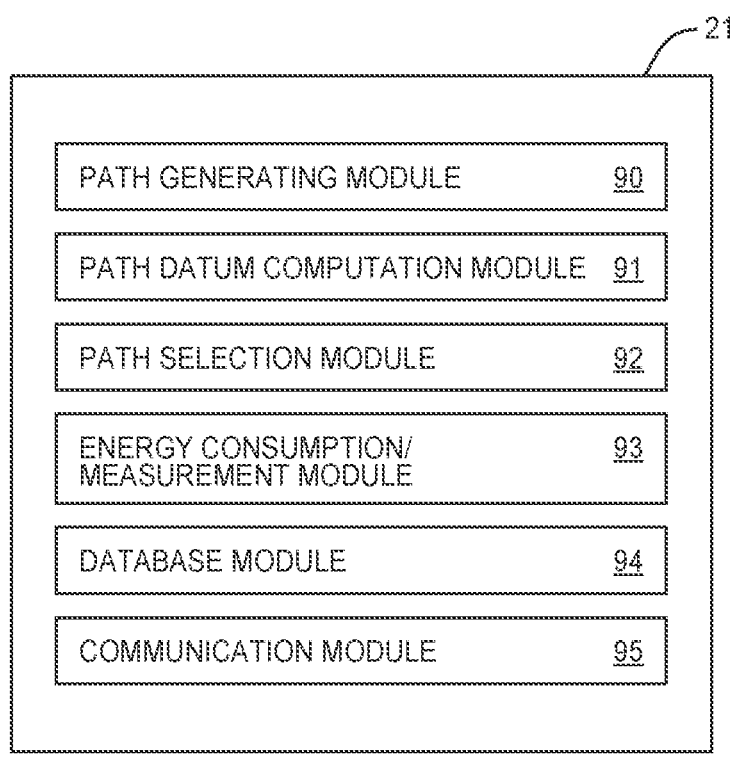
FIG. 18 is a schematic diagram of modules within processing circuitry of a computing device.

FIG. 18 is a functional block diagram illustrating processing circuitry 21 implemented according to different hardware units and software modules (e.g., as control program 26 stored in the memory circuitry 22). As seen in FIG. 18, processing circuitry 21 implements a candidate path generating unit and/or module 90, a path datum computation unit and/or module 91, a path selection unit and/or module 92, an energy consumption/measurement unit and/or module 93, an energy consumption database maintenance unit and/or module 94, and a communications interface unit and/or module 95.

The candidate path generating unit and/or module 90 is configured to generate one or more paths that extend from the origin to the destination. The module 90 is configured to determine the paths based on one or more parameters. The module 90 is further configured to determine the paths based on data from the database 27. The path datum computation module 91 is configured to calculate a datum for the paths and/or segments 31 of the paths. The path selection module 92 is configured to determine one of the paths for the travel. The module 92 can also be configured to receive an input regarding the selection of a path. The energy consumption/measurement module 93 is configured to measure the consumption of the energy by a vehicle 10 after and while traveling along a path. The database module 94 is configured to update the energy consumption database 27 with the data and information obtained by the energy consumption/measurement module 93. The communications module 95 is configured to communicate the data and information with the energy consumption database 27, as well as with the one or more sensors 13.

The various methods described above related to the energy usage and the amount of remaining energy can apply to the propulsion energy and/or the avionics energy. Examples include determinations based on just the propulsion energy usage and remaining amounts. Other examples include determinations based on just the avionics energy usage and remaining amounts. Other examples include determinations based on both the propulsion and avionics usage and remaining amounts.

Aspects of the present disclosure further include various methods and processes, as described herein, implemented using various hardware configurations configured in ways that vary in certain details from the broad descriptions given above. For instance, one or more of the processing functionalities discussed above may be implemented using dedicated hardware, rather than a microprocessor configured with program instructions, depending on, e.g., the design and cost tradeoffs for the various approaches, and/or system-level requirements.

The present invention may be carried out in other ways than those specifically set forth herein without departing from essential characteristics of the invention. The present embodiments are to be considered in all respects as illustrative and not restrictive, and all changes coming within the meaning and equivalency range of the appended claims are intended to be embraced therein.

What is claimed is:

1. A method of determining a three-dimensional path for an aircraft traveling through an airspace from an origin to a remote destination, the method comprising:
   determining a plurality of different three-dimensional paths that extend between the origin and the destination, the three-dimensional paths having different trajectories through the airspace with different altitudes;
   for each of the three-dimensional paths, determining an expected energy usage of the aircraft to travel the path and adjusting the expected energy usage based on one or more sensor readings that affect the travel;
   for each of the paths, determining an expected energy reserve which is an expected amount of energy remaining in the aircraft upon reaching the destination; and
   generating, within a user interface, a display of the three-dimensional paths and the expected amount of energy remaining in the aircraft.

2. The method of claim 1, further comprising dividing a three-dimensional space between the origin and the destination into a plurality of three-dimensional segments with each of the three-dimensional paths extending through a plurality of the three-dimensional segments.

3. The method of claim 2, further comprising for each of the paths:
   determining the three-dimensional segments that are included in the path;
   for each of the three-dimensional segments, determining the expected energy usage to travel the three-dimensional segment;
   for each of the three-dimensional segments, adjusting the expected energy usage based on the one or more sensor readings; and
   summing the expected energy usage for each of the three-dimensional segments and determining the expected energy usage used to travel the path.

4. The method of claim 3, further comprising determining the expected energy usage to travel the three-dimensional segment based on data from previous travel within the three-dimensional segment.

5. The method of claim 3, further comprising after traveling through each of the three-dimensional segments along one of the paths that is selected, updating the expected energy usage.

6. The method of claim 3, further comprising after traveling through each three-dimensional segment, updating travel data to include an actual energy usage of the aircraft traveling along the three-dimensional path through the three-dimensional segment.

7. The method of claim 1, further comprising receiving at least one of the sensor readings from one or more sensors on the aircraft.

8. The method of claim 1, further comprising receiving at least one of the sensor readings from one or more sensors positioned at the destination.

9. The method of claim 1, further comprising during the travel along one of the three-dimensional paths determining that the expected amount of energy remaining in the aircraft upon reaching the destination will be less than a predetermined amount and changing the three-dimensional path to the destination.

10. The method of claim 1, further comprising after traveling one of the paths, updating the travel data to include an actual energy usage of the aircraft traveling the three-dimensional path.

11. The method of claim 1, further comprising selecting for the travel one of the three-dimensional paths in which the expected energy reserve is greater than a predetermined amount.

12. A method of determining a three-dimensional path for an aircraft traveling through an airspace above ground from an origin to a remote destination, the method comprising:
   determining a plurality of different three-dimensional paths that extend between the origin and the destination with each of the paths having a different altitude above the ground;
   for each of the paths, determining an expected energy reserve which is an expected amount of energy remaining in the aircraft reaching the destination;
   selecting for the travel one of the three-dimensional paths in which the expected energy reserve is greater than a predetermined amount;
   updating data of previous travel after traveling along the path; and
   generating, within a user interface, a display that comprises the different three-dimensional paths and the expected energy reserve.

13. The method of claim 11, further comprising for each of the paths:
   dividing the path into multiple three-dimensional segments;
   for each of the three-dimensional segments, determining an expected energy usage to travel the three-dimensional segment;
   summing the expected energy usage for each of the three-dimensional segments and determining the expected energy usage used to travel the path; and
   based on the summed expected energy usage, determining the expected energy reserve for the path.

14. The method of claim 13, further comprising updating the expected energy usage of the path after traveling through each of the three-dimensional segments.

15. The method of claim 14, further comprising while traveling along the path determining that the expected energy usage of the path is greater than an expected amount and adjusting the path.

16. The method of claim 12, further comprising adjusting the expected reserve for each of the paths based on one or more sensor readings that affect the travel.

17. A computing device configured to manage an energy source for an aircraft traveling through an airspace above ground between an origin and a destination, the computing device comprising:
   a communications interface configured to communicate with the aircraft;
   an interface comprising a display;
   processing circuitry configured to:
      generate a plurality of different three-dimensional paths that extend between the origin and the destination with the different paths having different altitudes above the ground;
      for each of the three-dimensional paths, determine an expected energy usage of the aircraft to travel the path;
      for each of the three-dimensional paths, adjust the expected energy usage based on one or more sensor readings that affect the travel;
      for each of the three-dimensional paths, determine an expected energy reserve which is an expected amount of energy remaining in the aircraft upon reaching the destination; and
      display the three-dimensional paths and the expected energy usage on the interface.

18. The computing device of claim 17, wherein the processing circuitry is further configured to select for the travel one of the three-dimensional paths in which the expected energy reserve is greater than a predetermined amount.

19. The computing device of claim 17, wherein the processing circuitry is further configured to divide a three-dimensional space between the origin and the destination into a plurality of three-dimensional segments with each of the three-dimensional paths extending through a plurality of the three-dimensional segments and each of the three-dimensional segments having equal shapes and sizes.

20. The computing device of claim 19, wherein the processing circuitry is further configured to:
   determine the three-dimensional segments that are included in the path;
   for each of the three-dimensional segments, determine the expected energy usage to travel the three-dimensional segment;
   for each of the three-dimensional segments, adjust the expected energy usage based on the one or more sensor readings; and
   sum the expected energy usage for each of the three-dimensional segments and determining the expected energy usage used to travel the path.

* * * * *